(12) United States Patent
Pothoven et al.

(10) Patent No.: US 6,666,739 B2
(45) Date of Patent: Dec. 23, 2003

(54) METHOD FOR MANUFACTURING AN ELECTRODELESS LAMP

(75) Inventors: Floyd R. Pothoven, Bellflower, CA (US); Terry A. Pothoven, Bellflower, CA (US)

(73) Assignee: Ceravision Technology Limited, Dublin (IE)

(*) Notice: Subject to any disclaimer, the term of this patent is extended or adjusted under 35 U.S.C. 154(b) by 461 days.

(21) Appl. No.: 09/737,034

(22) Filed: Dec. 14, 2000

(65) Prior Publication Data

US 2001/0030509 A1 Oct. 18, 2001

Related U.S. Application Data

(60) Provisional application No. 60/173,214, filed on Dec. 27, 1999.

(51) Int. Cl.$^7$ .............................. H01J 9/26; H01J 61/36; H01J 65/00
(52) U.S. Cl. ................. 445/43; 445/40; 65/43
(58) Field of Search ................. 313/110, 573, 313/634, 624, 625, 493; 445/39, 42, 43, 44, 26, 23; 315/248, 111.21; 65/43, 58

(56) References Cited

U.S. PATENT DOCUMENTS

| | | | |
|---|---|---|---|
| 3,942,058 A | 3/1976 | Haugsjaa et al. | |
| 4,010,400 A | 3/1977 | Hollister | |
| 4,232,243 A | 11/1980 | Rigden | |
| 4,266,162 A | 5/1981 | McNeill et al. | |
| 4,383,203 A | 5/1983 | Stanley | |
| 4,422,017 A | 12/1983 | Denneman et al. | |
| 4,485,333 A | 11/1984 | Goldberg | |
| 5,013,976 A | * 5/1991 | Butler | 315/248 |
| 5,727,975 A | * 3/1998 | Wei et al. | 445/22 |
| 6,126,889 A | * 10/2000 | Scott et al. | 264/632 |

\* cited by examiner

*Primary Examiner*—Jay Patidar
(74) *Attorney, Agent, or Firm*—Ware, Fressola, Van Der Sluys & Adolphson LLP

(57) ABSTRACT

The lamp consists of a hollow tubular body 1 with a closed end 2 and an open end 3. The body is of sintered ceramic material. A window 4 is sealed across the open end, the window and the body being united by a layer of frit 5. The window is of sapphire. Within the body is sealed an inert gas atmosphere 6 and a pellet charge of excitable material 7. In use, the lamp is subjected to RF electromagnetic radiation which heats it to 1000° C. causes it to emit visible light via the sapphire.

6 Claims, 2 Drawing Sheets

METHOD FOR MANUFACTURING AN ELECTRODELESS LAMP

This application claims the benefit of Provisional application Ser. No. 60/173,214, filed Dec. 27, 1999.

TECHNICAL FIELD

The present invention relates to an electrodeless lamp, that is to say a hollow structure containing a material excitable by radio frequency energy to emit visible light.

BACKGROUND OF THE INVENTION

It is known to fabricate such lamp from sintered ceramic components. For instance, U.S. Pat. No. 5,727,975 describes the production of lamps from components that are shrunk fitted to each other.

SUMMARY OF THE INVENTION

The object of the present invention is to enable an electrodeless lamp to be constructed from components which are sealed together using a glass or alumina frit have a melting temperature higher than that of a charge of excitable material in the lamp.

According to a first aspect of the invention there is provided an electrodeless lamp comprising:
 a hollow body of ceramic material having an open end and containing a charge of excitable material with a given melting point;
 a translucent closure at the open end of the body;
 a seal between the body and the closure, the seal being of fused material having a fusing point higher than that of the excitable material.

According to another aspect of the invention there is provided a method of production of an electrodeless lamp of the first aspect, the method consisting in the steps of:
 applying frit material to the open end of the hollow body prior to sealing;
 inserting the charge of excitable material into the hollow body;
 positioning the translucent closure across the open end of the hollow body;
 applying laser irradiation to the frit material through the translucent closure, to locally raise its temperature to its fusing point for sealing of the window to the body without causing the excitable material to melt.

The laser may be traversed around the periphery of the body at its open end, to fuse the window to the body with the frit around the entire periphery. Alternatively, the laser may be arranged to provide an annular irradiation of the window around the entire periphery simultaneously.

Preferably, the irradiation will be carried out in a chamber, where the body and the window have been preheated at high vacuum to draw any volatile material from these components prior to sealing. Conveniently, the window is arranged at, but not across, the end of the body during the pre-heat and evacuation. The excitable material is then introduced into the body, the window moved into position and the laser operated to effect the seal.

Whilst the lamps can be processed individually in the chamber, it is preferred to process a plurality of them, mounted in a jig, in the chamber at one time.

BRIEF DESCRIPTION OF THE DRAWINGS

To help understanding of the invention, a specific embodiment thereof will now be described by way of example with reference to the accompanying drawings, in which.

BEST MODE FOR CARRYING OUT THE INVENTION

Figure 1:
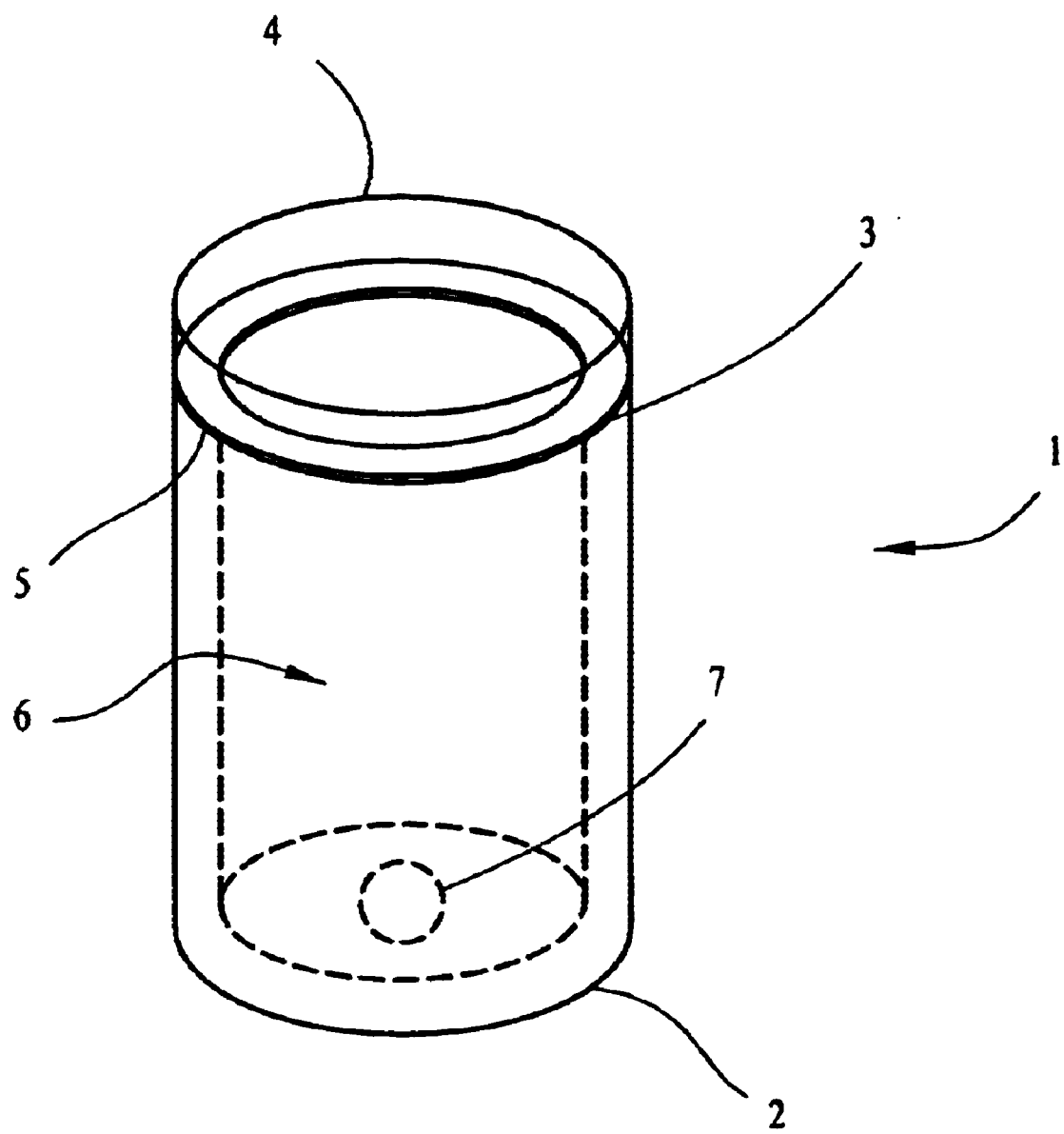
FIG. 1 is a perspective view of an electrodeless lamp according to the invention.
Figure 2:
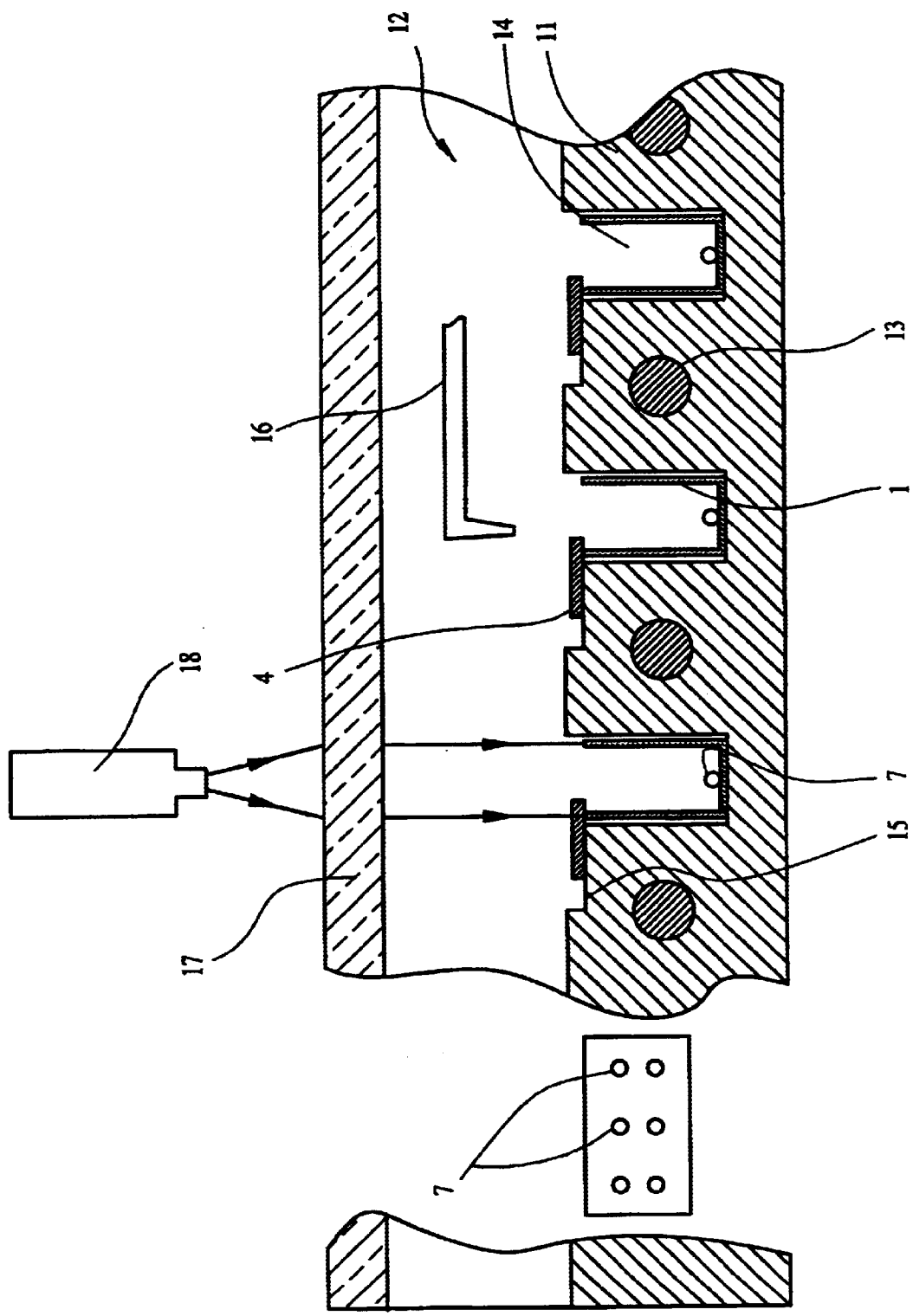
FIG. 2 is a diagrammatic side view of a chamber for the production of lamps of FIG. 1.

The lamp consists of a hollow tubular body 1 with a closed end 2 and an open end 3. The body is of sintered ceramic material. A window 4 is sealed across the open end, the window and the body being united by a layer of frit 5, that is sintered glass or alumina material. The window is of sapphire. Within the body is sealed an inert gas atmosphere 6 and a pellet charge of excitable material 7. In use, the lamp is subjected to RF electromagnetic radiation which heats it to 1000° C. causes it to emit visible light via the sapphire.

In the production of the lamp, the body is formed in the green state of ceramic material and pre-fired to drive off the initial binding material causing the ceramic particles to bind together in a gas tight manner. The body, together with a plurality of similar bodies, is dipped at its open end or sprayed at an oblique angle (to avoid filling of the interior) with unfired frit material 5. It is then inserted into a jig 11 and introduced into an evacuable chamber 12 having heaters 13. The jig has recesses 14 for the bodies 1 and seats 15 for windows 4 such that each window partially closes the mouth of its open body.

The bodies are preheated typically by radiation in the chamber 12 to a temperature close to but below the fusing point of the frit, typically 1000° C. against 1200° C. Simultaneously, the chamber is evacuated. Thus the body and the frit in particular have volatile contaminants drawn out of them. They are then cooled to around 500° C. by the introduction of an inert gas atmosphere into the chamber. A manipulator 16 picks a pellet 7 of the excitable material from a cool region of the chamber and places it in the body. The manipulator is then manoeuvred once more to move the windows fully across the mouths of the bodies. Via a quartz top window 17 of the chamber, a laser 18 is deployed to irradiate the frit. The laser is focused on the frit, whereby it can raise the frit to its fusing temperature of 1200° C. without melting the pellet, which typically has a melting point of 650° C. Thus the excitable material and the inert gas atmosphere is enclosed in the lamp.

The choice of the inert gas and the excitable material will be within the abilities of the man skilled in the art, as will be the choice of ceramic material. This can be of alumina ceramic or quartz ceramic. Equally, the window can be of alumina for example artificial sapphire or of quartz.

We claim:

1. A method of production of an electrodeless lamp of the type comprising a hollow body of ceramic material having an open end and containing a charge of excitable material with a given melting point, a translucent closure at the open end of the body and a seal between the body and the closure, the seal being of fused material having a fusing point higher than that of the excitable material, the method consisting in the steps of:
 applying frit material to the open end of the hollow body prior to sealing;
 inserting the charge of excitable material into the hollow body;
 positioning the translucent closure across the open end of the hollow body;
 applying laser irradiation to the frit material through the translucent closure, to locally raise its temperature to its fusing point for sealing of the window to the body without causing the excitable material to melt.

2. A production method as claimed in claim 1, wherein the laser is traversed around the periphery of the body at its open end, to fuse the window to the body with the frit around the entire periphery.

3. A production method as claimed in claim 1, wherein the laser is arranged to provide an annular irradiation of the window around the entire periphery of the body at its open end simultaneously to fuse the window to the body with the frit.

4. A production method as claimed in claim 1, wherein the body and the window are preheated at high vacuum in a vacuum chamber to draw any volatile material from these components prior to sealing, the irradiation being carried out in the chamber.

5. A production method as claimed in claim 1, further including the steps of:
   arranging the window at, but not across, the end of the body during the pre-heat and evacuation,
   introducing the excitable material into the body,
   moving the window into position and
   operating the laser to effect the seal.

6. A production method as claimed in claim 5, wherein a plurality of the lamps are mounted in a jig and processed simultaneously in the chamber.

* * * * *